Patented June 4, 1929.

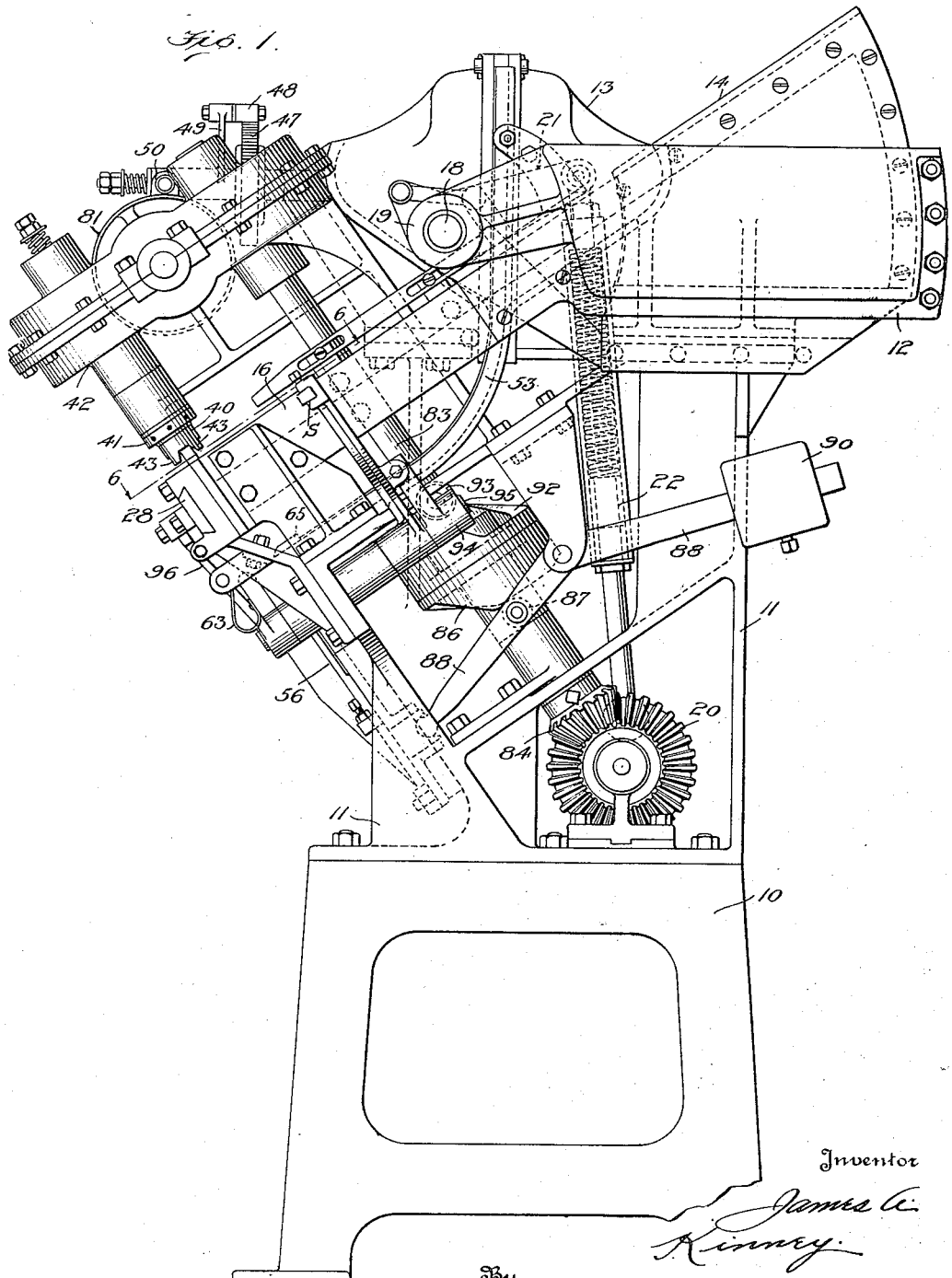

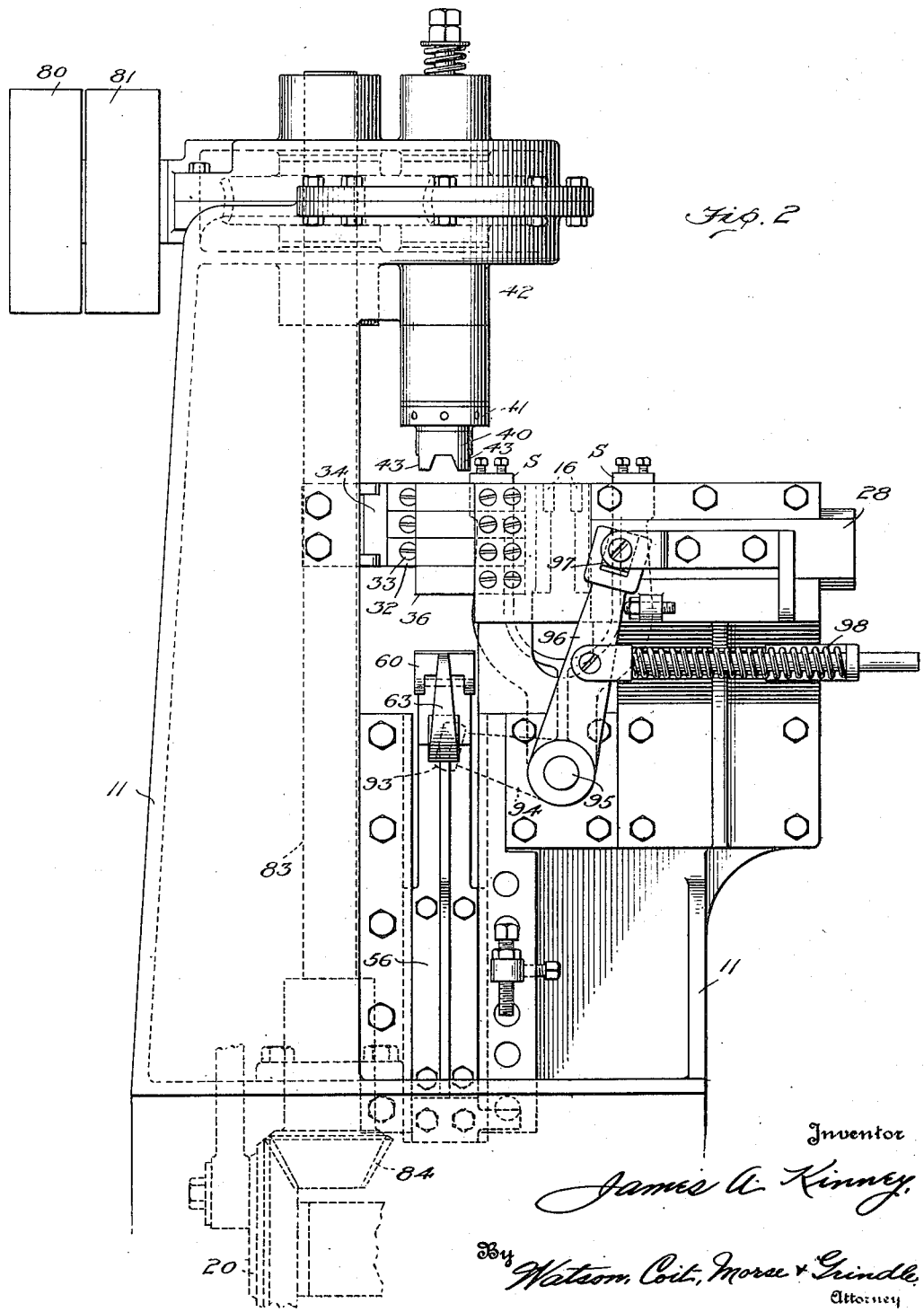

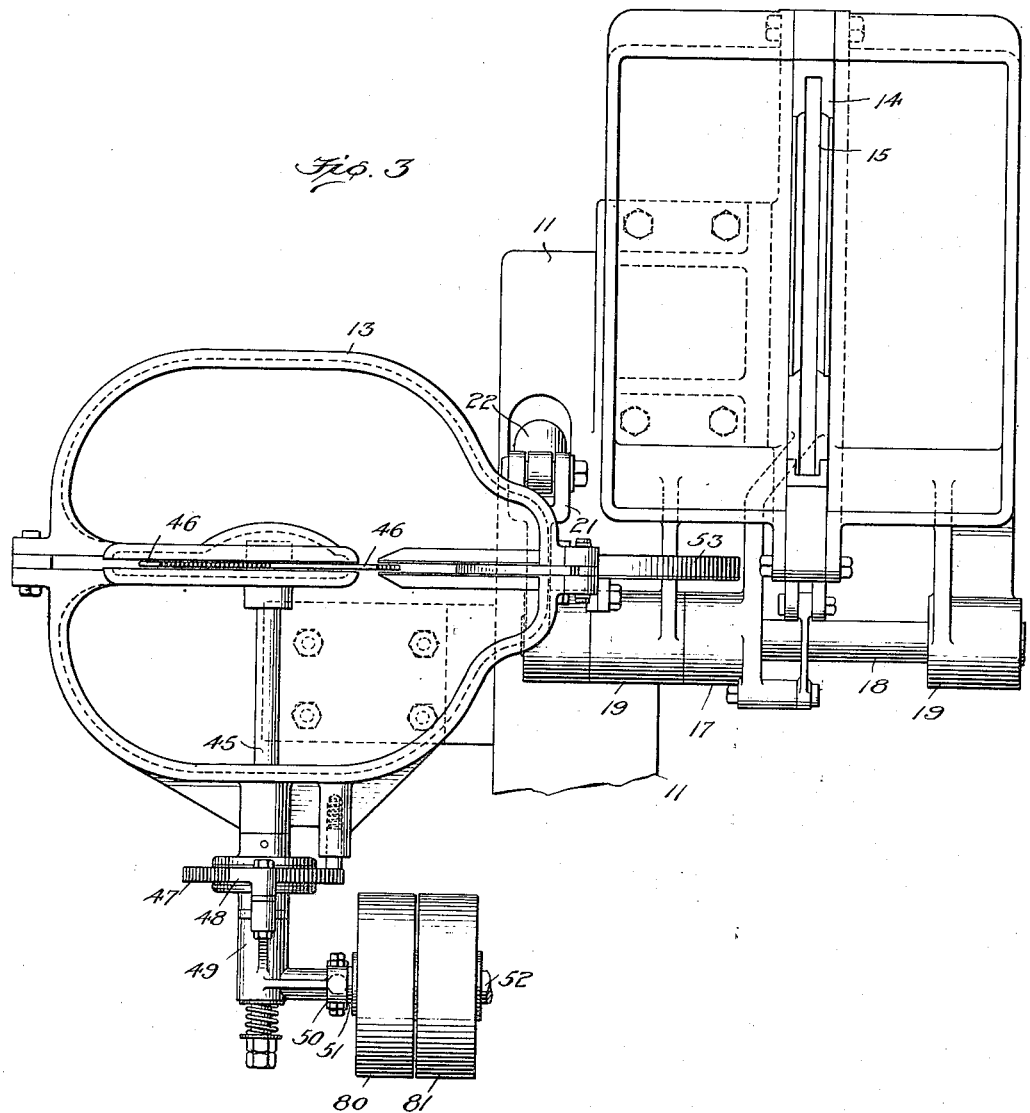

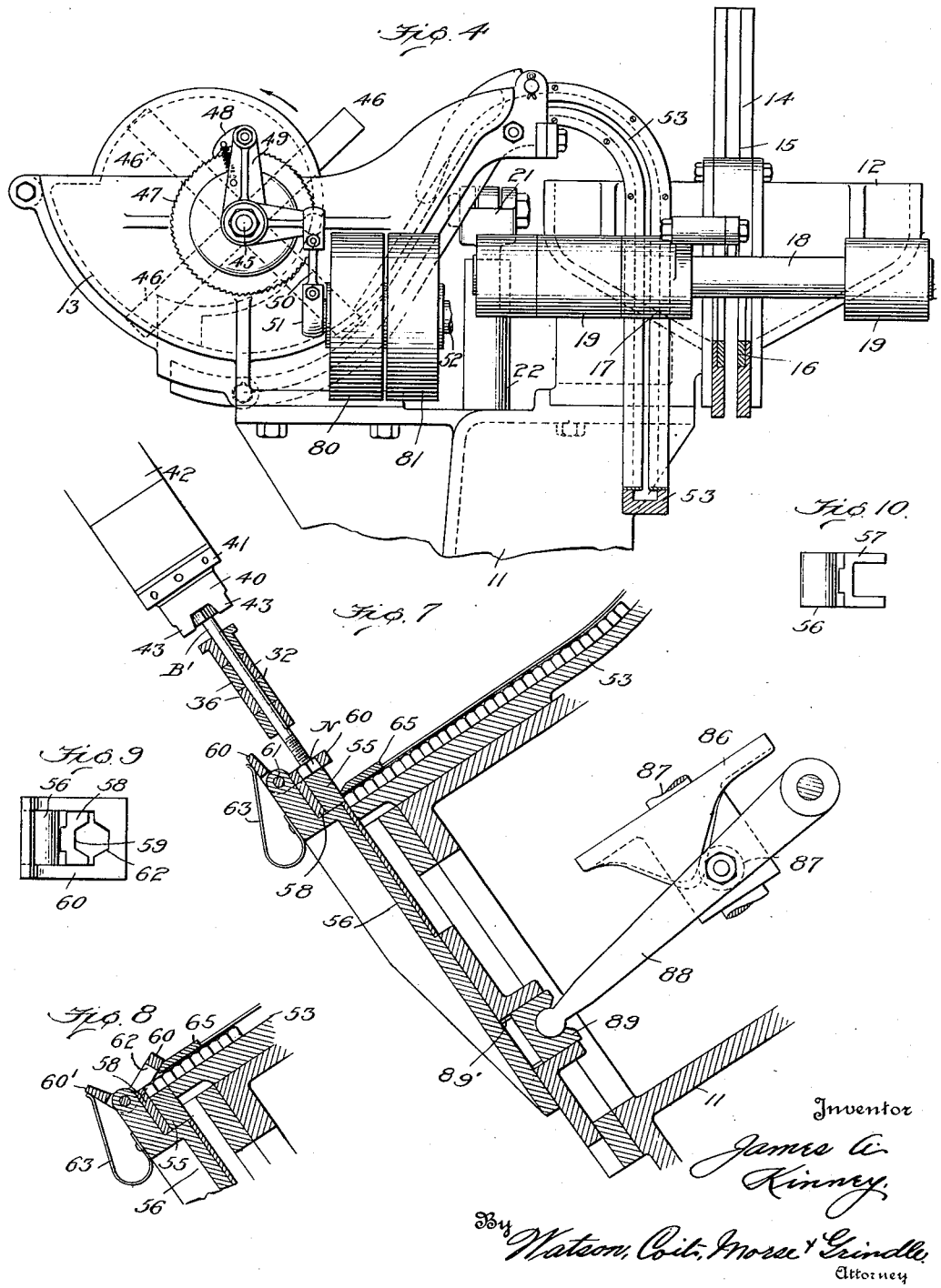

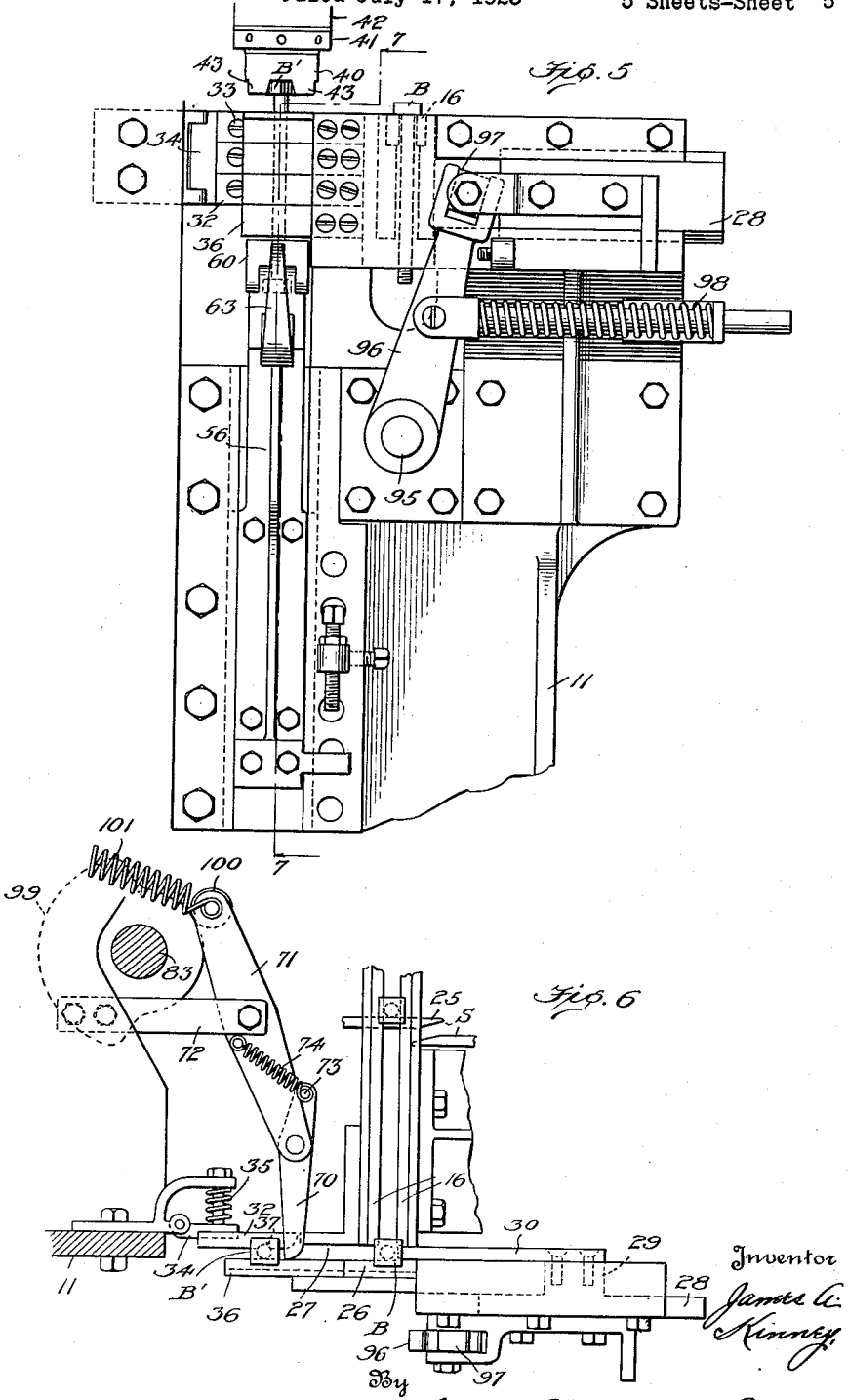

1,715,606

UNITED STATES PATENT OFFICE.

JAMES A. KINNEY, OF LEBANON, PENNSYLVANIA, ASSIGNOR TO BETHLEHEM STEEL COMPANY, OF BETHLEHEM, PENNSYLVANIA, A CORPORATION OF PENNSYLVANIA.

MACHINE FOR ASSEMBLING BOLTS AND NUTS.

Application filed July 17, 1923. Serial No. 652,165.

The present invention relates to machines for assembling bolts and nuts.

Bolts and the nuts provided for use therewith are, of course, separately machined but before shipment it is generally found desirable to assemble with each bolt the nut with which it is to be used, instead of shipping these members separately. The present invention constitutes an improvement in the class of machines designed or constructed heretofore for the purpose of assembling bolts and nuts and it is the object of this invention to provide a comparatively simple machine of this class, entirely automatic in character and adapted to continuously assemble bolts and nuts, the bolts and nuts being fed from hoppers to means for bringing them into axial alignment and for effecting their relative rotation so that the nut is caused to run up on the threads of the bolt. The nut and bolt hoppers are of relatively large size requiring only occasional refilling by an attendant and the machine accomplishes the assembling rapidly and easily. The machine is adapted for use with bolts of different lengths and with nuts of different cross section, that is, either square or hexagonal nuts. There are many features of novelty in the details of the machine and in certain sub-combinations of parts as well as in the general arrangement of its component elements. The embodiment of the invention disclosed is however given by way of example only and one skilled in the art will appreciate that the design and arrangement of the component elements may be considerably modified without departing from the spirit and scope of the invention. In the drawings:

Figure 1 is an end elevation of the machine;

Figure 2 is a front view of the upper portion of the machine, the parts illustrated being shown in elevation although they are actually inclined to the vertical, as shown in Figure 1;

Figure 3 is a top plan view of a portion of the machine showing the nut and bolt hoppers;

Figure 4 is a side elevation of the mechanism shown in Figure 3;

Figure 5 is a front elevation of the bolt and nut assembling mechanism, the elements being shown in different positions from those which they occupy in Figure 2;

Figure 6 is a section on line 6—6 of Figure 1;

Figure 7 is a section on line 7—7 of Figure 5 and also showing the nut feeding trackway;

Figure 8 is a section through a device for holding the hexagonal nuts during the assembling operation;

Figure 9 is a top plan view of the same; and

Figure 10 is a top plan view of a device for holding square nuts during the assembling operation.

The base of the machine is indicated at 10 and to this base is bolted a superstructure or pedestal 11 designed and constructed to support the bolt and nut hoppers and the moving parts of the assembling mechanism. The bolt hopper is indicated at 12 and the nut hopper at 13. These hoppers are of large capacity and are positioned considerably above the point of assembling of the bolts and nuts so that these articles move into position for assembly under the influence of gravity. The bolt hopper 12 has its bottom sloped downwardly from the sides toward a central longitudinal slot and working vertically through this slit is a blade 14 which is in turn slotted at 15 and designed to pick up the bolts by their heads when vertically reciprocated, and to cause them to slide downwardly onto a trackway 16, which constitutes a continuation of the upper surface of the blade 14 when the latter is in its uppermost position, as shown in Figure 1. The blade 14 has a forward extension which includes a sleeve 17 fixed upon a rock shaft 18 which is in turn rotatably supported in bearings.

The blade 14 is caused to rock about the axis of shaft 18 as the latter is rotated in its bearings, and rotation of the shaft 18 is in turn caused by rotation of a gear 20 to which it is connected by the arm 21, keyed to the shaft 18, and the link 22 which connects the outer extremity of this arm to the drive gear 20, the link being connected to the gear at a point eccentric to its axis. As before stated, the bolts are picked up by their heads upon upward movement of the blade 14 and slide downwardly under the influence of gravity onto the trackway 16. The bolts move down this trackway until they strike the uppermost finger 25 of the bolt separator S, the details of which are not illustrated since such separators are well known in the art.

The bolt separator operates at predetermined intervals of time to permit individual bolts to continue down the trackway 16 but restrains the column of bolts behind it from moving downwardly in a body. At the lower end of the trackway 16 each individual bolt released by the separator S is halted by a transversely extending bracket 26 rigidly secured to the frame of the machine, the bolt being still supported by its head, the shank however lying opposite a groove 27 between the bracket 26 and the front edge of the frame.

A slide is indicated at 28, fitting closely within a horizontal slideway in the bracket 26, which slide is provided with a lug or extension 29 extending through a groove in the bracket. Bolted or otherwise suitably secured to the rear end of lug 29 is a pusher plate 30 adapted to reciprocate within the groove 27 as the slide is moved, by mechanism hereinafter to be described, transversely of the trackway 16 in the operation of the machine. Normally the slide and the pusher plate 30 occupy the positions in which they are illustrated in Figure 6, the front edge of the pusher plate lying closely adjacent the mouth of the trackway 16. Movement of the slide and pusher plate to the left results in movement of the bolt B, lying in front of the same, toward the left (Figure 6) so that it occupies the position of bolt B', which has been moved to such position in the preceding movement of the pusher plate.

The bolt B' is illustrated in the position which it occupies when the nut is threaded thereon and from this position it is discharged from the machine after the threading operation has been accomplished. The bolt B' is confined between a plate 32 built up of a number of individual fingers or strips which are detachably secured, as by screws 33, to a pivoted bracket 34 normally pressed by a spring 35 in the direction of the bracket 26. Lying parallel to the fingers 32 are a second series of fingers or plates 36 secured to the bracket 26 by screws or other devices so as to be readily detachable. The plates 32 are provided with aligned notches 37 and into these notches the shank of the bolt fits when the movement of the pusher slide has been completed so that the bolt is clearly moved into and held by a definite predetermined position by movement of the pusher. Inasmuch as the machine is required to handle bolts of different lengths, the retaining plates 32 and 36 are built up of individual strips or fingers in the manner described. For long bolts additional plates or fingers are secured to the base plates to which they are attached and for bolts of short length certain of the lowermost plates or fingers may be removed, it being intended that the point of the bolt shall extend for some distance below the lowermost of the retaining plates or fingers, as shown in Figure 7, so that the nuts may be readily threaded thereon.

Bolt B' is exactly in axial alignment with a rotatable member 40 connected by means of a clutch disk 41 to a rotatable spindle extending through the housing 42. The member 40 has four downwardly extending lugs 43 which in reality constitute clutch teeth adapted to engage the flats of the bolt head when the bolt has been moved upwardly into engagement therewith. The member 40 is constantly rotating and whenever a bolt is moved upwardly so that its head is engaged thereby the bolt is given a corresponding rotation which effects the threading of the nut on the bolt, the nut having been brought into axial alignment with the shank and pressed upwardly thereagainst by mechanism now to be described.

The nut hopper is bowl shaped and mounted upon a shaft 45 extending transversely of the hopper are four blades 46 which constitute agitating and pusher blades. The shaft 45 is rotated in the direction of the arrow (Figure 4) intermittently through the ratchet disk 47, pawl 48, bell crank lever 49 and link 50, which is connected to an eccentric 51 mounted upon the power shaft 52. As the blades 46 move through the hopper they cause the nuts therein to be fed to the trackway 53, which is so curved (as can be seen from Figures 1 and 4) that the nuts are delivered at a point adjacent the lower end of the bolt B', that is, the bolt which is in assembling position.

In Figure 7 a nut receiving block 55 is illustrated and upon this block the lowermost nut is received when the upper face of the block is flush with the lower surface of the trackway 53. The block 55 is mounted upon a slide 56 movable axially of the rotatable spindle to which the member 40 is connected and in the operation of the machine the slide 56 moves upwardly after a bolt has been positioned above it, carrying the lowermost nut N upwardly against the lower end of the bolt and thereafter continuing its motion, lifting the bolt itself upwardly into engagement with the rotating member 40.

When square nuts are being handled the yoke member 57 is secured to the slide 56 and each successive nut is received between the arms of this member which prevents it from rotating, so that the necessary relative movement of the bolt and nut may be had in accomplishing the assembling operation. When hexagonal nuts are being handled the nut retaining device shown in Figures 7, 8 and 9 is employed. This device comprises a stationary member 58 recessed at 59 to receive with a close fit approximately one-half of a nut, and a second member 60 pivoted to the slide at 61 and recessed at 62 to fit around the opposite side of the nut. A spring 63 bears upon an arm or extension 60' of the member 60 and normally tends to press this member downwardly to fit around a nut resting against the member 58. A cross piece 65, however, bridges the trackway 53 at its lower end and when the slide 56 moves downwardly the member 60 contacts with this bridge member and is lifted upwardly against the action of the spring 63, as shown in Figure 8. The lowermost nut is then free to slide onto the nut receiving member 55. Upon upward movement of the slide 56 the bridge piece 65 no longer opposes downward movement of the member 60 and the latter moves downward to fit around the inner faces of the hexagonal nut so that it is firmly held against rotation. Upon upward movement of the slide the block 55 of course closes the end of the trackway 53 against the escape of additional nuts therefrom. In this manner the nuts are fed upwardly one at a time and firmly held against rotation during the assembling operation.

After assembly it is of course necessary to discharge the assembled bolt and nut from the machine and this is accomplished by means of a kicker lever 70 pivoted to the end of a rocking lever 71 which is in turn pivotally secured to a bracket 72 secured to the frame of the machine. A pin 73 prevents relative movement of the levers 70 and 71 in a clockwise direction and a spring 74 normally tends to prevent such movement in a counter-clockwise direction. Movement of lever 70 therefore towards the left (Figure 6) results in discharge of the bolt B' from between retaining plates and from the machine but movement in the opposite direction simply causes relative rotation of the levers 70 and 71 and permits the lever 70 to snap over the bolt which has been moved into assembling position and to take up a position to the right of the same ready to discharge this newly inserted bolt upon the completion of the assembling operation.

It is of course necessary to operate the bolt and nut feeding devices in synchronism in order that the various operations may be carried out in the proper order. The power shaft 52 has mounted thereon the usual fast and loose pulleys 80 and 81 adapted to receive from a suitable source the power necessary to operate the several mechanisms. This power shaft, as before mentioned, has an eccentric on its end which is connected by the link 50 to the nut feeding mechanism and it is also connected by suitable gearing to the spindle contained in housing 42 to which the member 40 is connected, and to the cam shaft 83 which extends parallel to this spindle. The cam shaft is provided with a bevel gear 84 at its lower end which meshes with the gear 20 which drives the blade 14 for feeding the bolts, and has mounted thereon at intermediate points cams for operating the nut and bolt feeding slides, and the discharge mechanism. Thus the cam 86 controls the downward movement of the nut feeding slide 56, the operative face of this cam being adapted to contact with a roller 87 mounted upon a rocker arm 88, one end of which is connected to a block 89 slidably retained in a recess 89' in the slide 56. The opposite end of lever 88 has a weight 90 adjustably secured thereto which normally tends to press the roller 87 against the cam 86. While the slide 56 is thus driven downwardly in a positive manner at predetermined intervals, its upward movement is controlled by the weight 90 and in this manner the nut is fed gradually onto the bolt in the threading operation.

Also mounted on the shaft 83 is a circular crown cam 92 with an upwardly facing cam surface. A roller 93 is adapted to bear upon the surface of this cam and this roller is connected to one end of a lever 94 secured to a rocker shaft 95 journalled in the frame of the machine. Secured to the shaft 95 is a lever 96, the upper end of which is bifurcated and the arms of which receive between them a block 97 pivotally secured to the slide member 28. The slide 28 is normally pressed toward the left by the spring 98 and hence is positively moved in one direction and moved by a spring in the opposite direction. Toward the top of the cam shaft 83 is secured a third cam 99 (Figure 6) against which bears the roler 100 secured to the inner end of the lever 71. A spring 101 having one end secured to the frame maintains the roller 83 in contact with the cam and the cam is so shaped that the lever 71 is operated at the completion of the nut and bolt assembly operation to effect the discharge of the assembled bolt and nut. The three cams 99, 92 and 86 are so shaped that the bolt feeding mechanism, the nut feeding mechanism and the ejecting mechanism operate in the proper sequence to perform the functions above outlined, with the result that the machine acts rapidly to deliver the assembled nuts and bolts so long as the hoppers are fed. The mechanism has been reduced to a minimum number of parts which parts are of simple design and easily obtainable, and the machine enables an unskilled worker to continuously effect the assembly of bolts and nuts in large quantities, with a minimum of personal attention.

As before pointed out the design and arrangement of the component elements may be modified as desired, the invention not being limited to the exact structure which is disclosed by way of example. One skilled in the art will appreciate the many advantages of the machine and will realize that changes may be made without departing from the spirit of the invention.

Having thus described the invention what is claimed as new and desired to be secured by Letters Patent is:

1. In a bolt and nut assembling machine, in combination, two spaced parallel plates, one of which is yieldable, and which are adapted to yieldably secure between them a bolt, and each of said plates comprising a plurality of removable sections, means for rotating a bolt held between said plates, and means for bringing a nut into engagement with said bolt.

2. In an assembling machine, in combination, a mechanism for feeding bolts and nuts into axial alignment including a trackway for nuts, a slide member adapted to move transversely of said trackway, a movable nut engaging member carried by said slide member adapted to prevent the rotation of a nut, and a stationary member of the trackway adapted to engage said nut engaging member whereby movement of the slide member causes relative movement between the latter and said nut engaging member.

3. In an assembling machine, in combination, a mechanism for feeding bolts and nuts in axial alignment including a trackway for nuts, a slide adapted to move transversely of said trackway and having a recess formed at the upper end thereof adapted to engage a portion of the wrench engaging faces of the nut to prevent its rotation, a movable member mounted on said slide adapted to engage the remaining portion of the wrench engaging faces of the nut, and means on said trackway to cause relative movement between said movable member and the slide during the movement of the latter.

4. In an assembling machine, in combination, a mechanism for feeding bolts and nuts into axial alignment including a trackway disposed in a plane inclined to the horizontal, a slide adapted to move in a path at right angles to the plane of said trackway, a constantly rotating head adapted to engage a bolt and disposed in alignment with the line of action of said slide, a recess formed at the upper end of the slide for receiving a nut at the exit of said trackway, means to yieldingly retain a bolt in a position inclined to the vertical and in coaxial relation with said head, means to reciprocate said slide, an ejector, and means synchronized with the operation of said slide to actuate said ejector for discharging the bolt from the machine.

In testimony whereof I hereunto affix my signature.

JAMES A. KINNEY.